United States Patent Office 2,968,679
Patented Jan. 17, 1961

2,968,679
POLYALLYLATION OF PHENOL

David Aelony, Minneapolis, Minn., assignor to General Mills, Inc., a corporation of Delaware No Drawing. Filed Jan. 17, 1958, Ser. No. 709,463

6 Claims. (Cl. 260—612)

The present invention relates to a process for the direct introduction of allyl and methallyl groups on the ring of phenol and cresols.

It is, therefore, an object of the present invention to provide a process for the direct introduction of allyl and methallyl groups onto phenol and cresol rings.

As applied to phenol as a starting material, the process involves the conversion of the phenol into sodium phenoxide followed by the reaction of a substantially anhydrous suspension of sodium phenoxide and finely divided sodium hydroxide with allyl chloride in a non-polar solvent. The present invention involves the reaction of the phenol with at least two moles of allyl chloride for the introduction of at least two allyl groups on the phenolic ring. The invention also contemplates the possibility of the introduction of a third allyl group on the ring and also of the etherification of the hydroxyl group with an allyl group. The introduction of the allyl group onto the oxygen may be accomplished either in the presence of a non-polar solvent or in the presence of a polar solvent. The sodium hydroxide is employed in a quantity slightly in excess of the equivalent of allyl chloride used.

In carrying out the process, the sodium phenoxide may be formed in any way, such as, for example, by reacting aqueous NaOH with phenol, followed by the removal of water from the reaction mixture. In preparing the phenoxide, it is preferred to employ the sodium hydroxide in a quantity approximately equivalent to the phenol, inasmuch as any excess NaOH tends to hold on to the water of reaction tenaciously and renders it much more difficult to dehydrate the sodium phenoxide. A preferred way of forming the sodium phenoxide is to react the phenol with solid sodium hydroxide in a finely divided form. Finely divided sodium hydroxide may be added as such to the reaction mixture or may be formed in situ by the addition of a solution of sodium hydroxide to the reaction mixture followed by evaporation of the water. When the sodium hydroxide is employed in a quantity equivalent to the phenol, the single mol of water formed in this reaction is very easily removed.

Following the formation of the sodium phenoxide, solid NaOH, suspended in a non-polar solvent, is added, followed by the allyl chloride in a molal ratio of from 2 to 5 mols per mol of phenol. The allyl chloride is fed at such a rate that the pot temperature is maintained within a suitable temperature range such as 80–140° C., preferably 110–120°. The reaction mixture is refluxed at a suitable temperature until the reaction has been conducted to a desired degree. This may require from 12 to 30 hours.

The product may be worked up in any conventional manner, as, for example, by washing the non-polar solvent layer with water, drying over sodium sulfate, and then stripping off the solvent to yield the product. Frequently a mixture of products may be obtained, particularly where low molal ratios of allyl chloride are employed. The mixture of products may include mono-allyl phenol, diallyl phenol, triallyl phenol, as well as allyl ethers of these compounds. These products may be separated by fractionation, if desired, or, as is frequently done, the product containing the lower degree of substitution may be distilled off, leaving a residue containing mixed compounds of the higher degrees of substitution, such as those containing two or more allyl groups.

The process is applicable to phenol and the cresols, ortho, meta, and para, as well as mixtures of these phenolic compounds, particularly the mixed cresols which are readily available at a low price commercially. The process is likewise applicable to the introduction of the allyl or methallyl group or to mixtures of these groups. These allyl compounds are useful as intermediates for polymerization to di- and polyphenols which can be converted into glycidyl ethers; they may be oxidized to hydroxy acids. They are of particular interest, however, as intermediates for epoxidation to yield epoxy compounds which are capable of polymerizing to form resins.

While the allyl groups are being introduced directly onto the phenolic nucleus, there also appears to be some introduction of the allyl group onto the hydroxyl oxygen. Once the allyl ether has been formed, there does not appear to be any further direct allylation of the ring. It is usually possible, however, to introduce sufficient allyl groups directly on the phenolic nucleus before sufficient allyl groups are introduced as ethers to stop further reaction. Where, however, it is desired to introduce three allyl groups onto the phenolic nucleus to the almost complete exclusion of compounds containing a lesser degree of allylation, it is possible to combine the present process with a process of rearrangement; thus the direct allylation process may be carried on to the degree possible to yield a mixture of compounds of varying degrees of allylation, including some allyl ether groups. This mixture may then be subjected to a rearrangement such that the allyl groups in the ether are rearranged and become attached to the ring. These rearranged products may then be subjected to a further direct allylation and/or to further etherification with allyl groups to yield a product composed almost exclusively of molecules containing three allyl groups on the ring, either with a free hydroxyl group or with an allyloxy group.

The following examples will serve to illustrate the invention.

Example 1

188 g. phenol (2 mols), 248 g. sodium hydroxide, 200 ml. water and 1½ l. xylene were refluxed under a Stark and Dean tube until no more water came over. 543 ml. allyl chloride was added at a rate permitting reflux at between 100° and 143° C. 67 ml. of water distilled. The product was washed with water, then with Claisen alkali, was dried over sodium sulphate, filtered, evaporated and fractionated in vacuo. The following fractions were obtained:

|  |  | G. | $n_D^{30}$ | Iodine values |
|---|---|---|---|---|
| Fraction #1 | 50–70° at 10 mm | 5.5 | 1.5023 | |
| Fraction #2 | 70–90° at 10 mm | 11 | 1.5147 | |
| Fraction #3 | 90–110° at 10 mm | 31 | 1.5188 | 264.4, 264.6 |
| Fraction #4 | 53–70° at 50μ | 43 | 1.5208 | 333.5, 332.8 |
| Fraction #5 | 70–92° at 35μ | 33 | 1.5213 | 351.4, 350.6 |
| Fraction #6 | 92–100° at 30μ | 85.5 | 1.5225 | 368.9, 368.8 |
| Fraction #7 | 100–10° at 25μ | 44 | 1.5236 | 381.5, 380.7 |
| Fraction #8 | 110–15° at 25μ | 70 | 1.5236 | 386.8, 387.1 |
| Residue | | 22 | | |
| Total | | 345 | | |

The wash water on acidification, extraction with xylene and evaporation yielded 6.5 g. $n_D^{30}$ 1.5300. The Claisen alkali yielded, on acidification, extraction with xylene, and evaporation, 17 g. material. Thus, the total yield was 368.5 g., an augmentation of 180.5 g., or 2.25 mols of allyl per mol of phenol. Theoretical iodine values for allylphenyl ether, allyl ether of allyl phenol, allyl ether of diallylphenol, and allyl ether of triallyl phenol are 190, 292, 356, and 400, respectively. The hydroxyl value of crude undistilled product prepared as above was around one, showing very little free phenols.

*Example 2*

188 g. phenol (2 mols), 107 g. water, 250 g. sodium hydroxide and 1 l. of toluene were agitated and refluxed over a Stark and Dean tube until no more water came over. 370 ml. of allyl chloride were added to the cooled mixture and reflux and agitation were resumed until no more water came over. The mixture was cooled again and 190 ml. allyl chloride, 300 ml. n-propanol and 60 g. 50% NaOH aqueous solution were added and reflux and agitation were continued for 24 hours. Propanol was distilled out. Water was added. The toluene solution was dried over Na$_2$SO$_4$, filtered, evaporated and fractionated in vacuo. The following fractions were obtained:

|  |  | G. | $n_D^{30}$ | Iodine values |
|---|---|---|---|---|
| Fraction #1 | 75-90° at 6 mm | 36 | 1.5171 | 214, 214.7 |
| Fraction #2 | 90-100° at 6 mm | 2 | 1.5184 |  |
| Fraction #3 | 90-100° at 6 mm | 2 | 1.5203 |  |
| Fraction #4 | 46-50° at 75μ | 10 | 1.5209 | 342.8, 342.8 |
| Fraction #5 | 50-60° at 120μ | 79.5 | 1.5217 | 346.7, 346.6 |
| Fraction #6 | 60-70° at 30μ | 73 | 1.5229 | 384.9, 387.5 |
| Fraction #7 | 70-82° at 30μ | 145 | 1.5240 | 394.1, 393.2 |
| Fraction #8 | (column removed) 98-130° at 45μ | 26 | 1.5278 | 389.3, 389.7 |
| Residue |  | 21 | 1.5563 | 302.1, 301.1 |
| Total |  | 394.5 |  |  |

Average augmentation was 2.58 allyls per mol of phenol.

*Example 3*

188 g. phenol (2 mols), 333 g. sodium hydroxide, 143 ml. water and 1,250 ml. of xylene were refluxed and agitated under a Stark and Dean tube until no more water came over. 800 ml. allyl chloride was added at a rate permitting the reflux to continue at 105–120° C. Water was added. The xylene solution was washed with Claisen alkali, dried over Na$_2$SO$_4$, filtered, evaporated and distilled. The following fractions were collected:

|  |  | G. | $n_D^{30}$ | Iodine value |
|---|---|---|---|---|
| Fraction #1 | 70-80° at 6 mm | 7 | 1.5103 |  |
| Fraction #2 | 80-90° at 6 mm | 17 | 1.5153 |  |
| Fraction #3 | 90-100° at 6 mm | 24 | 1.5176 |  |
| Fraction #4 | 100-10° | 13 | 1.5187 |  |
| Fraction #5 | <103 at 50μ | 353 | 1.5221 | 353.1 |
| Residue |  | 38 | 1.5570 |  |
| Total |  | 452 |  |  |

Average augmentation was 3.3 allyls per mol of phenol.

*Example 4*

188 g. phenol (2 mols), 250 g. sodium hydroxide, 107 ml. of water, 1,250 ml. xylene were refluxed and agitated under a Stark and Dean tube until no more water came over. 600 ml. allyl chloride was then added at such a rate as to permit refluxing at 100° to 120° C. When no more water came over, the product was cooled; 300 ml. n-propanol, 80 g. NaOH and 200 ml. allyl chloride were added and refluxing and agitation were continued overnight. The product was filtered, distilled until vapor temperature reached 120°, washed with water and with Claisen alkali. It was dried over Na$_2$SO$_4$, filtered, evaporated, and fractionated in vacuo. The following fractions were collected.

|  |  | G. | $n_D^{30}$ | Iodine value |
|---|---|---|---|---|
| Fraction #1 | 90-1° at 15 mm | 68 | 1.5161 | 191.3, 191.2 |
| Fraction #2 | 32-42° at 35 μ | 56 | 1.5171 | 206, 205.7 |
| Fraction #3 | 42-3° at 20 μ | 92 | 1.5201 | 324.3, 324.2 |
| Fraction #4 | 43-60° at 20 μ | 53 | 1.5207 | 378.0, 379 |
| Fraction #5 | 60-80° at 40 μ | 25 | 1.5221 | 379.5, 380.1 |
| Fraction #6 | 80-90° at 90 μ | 50 | 1.5234 | 375.6, 375.6 |
| Fraction #7 | (column removed) 84-100° at 80 μ | 75 | 1.5234 | 366.1, 365.4 |
| Residue |  | 32 |  |  |
| Total |  | 451 |  |  |

Average augmentation was 3.3 mols of allyl per mol of phenol.

*Example 5*

Phenol (94 g.), sodium hydroxide scales (41 g.) and xylene (500 ml.) were agitated and refluxed under a Stark and Dean tube. 18 ml. of water distilled out in 35 minutes. Then 82 g. powdered NaOH suspended in 350 ml. xylene were added, followed by a total of 300 ml. allyl chloride, fed at such a rate that the pot temperature was maintained at 115–120° C. The reaction was over in 14 hours after the addition of allyl chloride began. The xylene layer was washed with water, dried over sodium sulfate, and stripped of xylene at 10 mm. The residue weighed 188 g. $n_D^{30}$ 1.5225. This residue was fractionated in vacuo to 72° at 25μ and the residue, $n_D^{30}$ 1.5257, had an iodine value of 382.

*Example 6* o-Cresol (216 g.), sodium hydroxide scales (248 g.), water (110 ml.) and xylene (2 liters) were refluxed and agitated under a Stark and Dean tube. In 11 hours, 132 ml. of water came over (theory 146 ml.). Allyl chloride (550 g.) was added at a rate maintaining temperature at 110°. In 39 hours, 59.5 ml. water was produced. The product was washed with water, two portions of Claisen alkali, water, dried over sodium sulfate, filtered, evaporated and fractionated. The allyl ether of diallyl o-cresol boiled at 105° at 50μ $n_D^{30}$ 1.5186, iodine value 331 (theory 334). Virtually nothing was recovered from the Claisen alkali extract.

*Example 7* p-Cresol (216 g.), sodium hydroxide scales (250 g.), water (107 ml.) and toluene (2 liters) and a hydrocarbon solvent b. 100–140° C. (Skellysolve E) (500 ml.) were refluxed and agitated under a Stark and Dean tube. In 48 hours 135 ml. of H$_2$O distilled. A total of 500 ml. of allyl chloride was gradually added. In 4 days, 50 ml. of water were distilled. The product was washed with water, Claisen alkali, water, dried over sodium sulfate, filtered and fractionated in vacuo. Fraction boiling at 65° at 30 $n_D^{30}$ 1.5182 having iodine value of 317.2 was collected.

*Example 8*

Phenol (188 g.), sodium hydroxide (333 g.), water (143 ml.), and xylene (1,250 ml.) were refluxed and agitated for 14 hours. 184 ml. of water distilled out. Methallyl chloride (800 g.) was added at such a rate that the mixture refluxed at 110° to 120°. 71 ml. of water distilled 14 hours after all the methallyl chloride was added. Then 300 ml. n-propanol and 200 ml. methallyl chloride were added and reflux and agitation were continued for 8 hours. The product was washed with water, Claisen alkali, water, dried over sodium sulfate, filtered, evaporated and fractionated in vacuo.

|  |  | G. | $n_D^{30}$ | Iodine value |
|---|---|---|---|---|
| Fraction #1 | 40-55° at 30 μ | 75 | 1.5127 | 248 |
| Fraction #2 | 55-65° at 20 μ | 68 | 1.5126 | 268.4 |
| Fraction #3 | 65-90° at 20 μ | 81 |  | 307.4 |
| Fraction #4 | 90° at 20 μ | 91 | 1.5135 | 318.6 |
| Fraction #5 (high column removed) | 90-110° at 50 μ | 128 | 1.5119 | 333.6 |
| Residue |  | 15 |  |  |

In all the preceding examples the products had a very low hydroxyl number, showing that the hydroxyl group was largely etherified.

I claim as my invention:

1. Process of preparing polyallylated phenolic compounds which comprises reacting a phenolic derivative selected from the group consisting of sodium phenoxide and the sodium cresylates under anhydrous conditions with a compound selected from the group consisting of allyl chloride and methallyl chloride in the presence of a suspension of solid sodium hydroxide in a non-polar solvent at a temperature in the range of 80–140° C., the chloride compound being employed in a mol ratio of at least 2:1 based on said phenolic derivative.

2. Process according to claim 1 in which the sodium hydroxide is in the form of a powder.

3. Process according to claim 1 in which phenolic derivative is formed by the reaction of solid NaOH on the free phenol in substantially equimolar proportions, followed by the removal of the water of reaction.

4. Process of preparing polyallylated phenolic compounds which comprises reacting sodium phenoxide with from 2 to 4 mols of allyl chloride under anhydrous conditions in the presence of a suspension of solid sodium hydroxide in an aromatic non-polar solvent at a temperature in the range of 80–140° C. to introduce at least two allyl groups onto the phenolic nucleus.

5. Process according to claim 4 in which the allyl phenol is converted to the allyl ether of allyl phenol by a further reaction with allyl chloride in the presence of a polar solvent.

6. Process of preparing polyallylated phenolic compounds which comprises reacting sodium cresylate with from 2 to 4 mols of allyl chloride under anhydrous conditions in the presence of a suspension of solid sodium hydroxide in an aromatic non-polar solvent at a temperature in the range of 80-140° C. to introduce at least two allyl groups onto the phenolic nucleus.

References Cited in the file of this patent

FOREIGN PATENTS 412,169 Germany _____ Apr. 15, 1925

OTHER REFERENCES

Tarbell: Chem. Reviews, vol. 27 (1940), page 503 (1 page).